US010326171B2

(12) United States Patent
Herrema et al.

(10) Patent No.: US 10,326,171 B2
(45) Date of Patent: Jun. 18, 2019

(54) INTELLIGENT MONITORING SYSTEMS FOR LIQUID ELECTROLYTE BATTERIES

(71) Applicant: Flow-Rite Controls, Ltd., Byron Center, MI (US)

(72) Inventors: Mark Herrema, Rockford, MI (US); Ron D. Earl, Wyoming, MI (US); Scott Kloote, Coopersville, MI (US); Jason L. Fox, Holland, MI (US)

(73) Assignee: FLOW-RITE CONTROLS, LTD., Byron Center, MI (US)

(*) Notice: Subject to any disclaimer, the term of this patent is extended or adjusted under 35 U.S.C. 154(b) by 584 days.

(21) Appl. No.: 15/079,124

(22) Filed: Mar. 24, 2016

(65) Prior Publication Data

US 2017/0279164 A1 Sep. 28, 2017

(51) Int. Cl.
*H01M 10/06* (2006.01)
*H01M 10/48* (2006.01)
(Continued)

(52) U.S. Cl.
CPC .......... *H01M 10/06* (2013.01); *H01M 2/362* (2013.01); *H01M 10/425* (2013.01);
(Continued)

(58) Field of Classification Search
CPC .... H01M 10/06; H01M 10/425; H01M 2/362; H01M 10/48; H01M 10/486; H01M 10/484; H01M 2200/00; H01M 2010/4278

See application file for complete search history.

(56) References Cited

U.S. PATENT DOCUMENTS

| 6,031,354 A | 2/2000 | Wiley et al. |
| 6,943,566 B2 | 9/2005 | Florin et al. |

(Continued)

FOREIGN PATENT DOCUMENTS

| AU | 2005234650 | 6/2006 |
| EP | 1 889 310 | 8/2010 |

OTHER PUBLICATIONS

Flow measurement, available Jan. 20, 2016 at https://web.archive.org/web/20160120033532/https://en.wikipedia.org/wiki/Flow_measurement (Year: 2016).*

(Continued)

*Primary Examiner* — Daniel R Miller
(74) *Attorney, Agent, or Firm* — Warner Norcross and Judd LLP

(57) ABSTRACT

An improved battery monitoring system for liquid electrolyte batteries is provided. The battery monitoring system includes a network of sensors for monitoring the condition or performance of a plurality of liquid electrolyte batteries, for example lead-acid batteries. The sensors are adapted to share data regarding battery condition or battery performance to a standalone device over a wireless local area network. A server in electrical communication with the standalone device receives some or all of the data for analysis, which can result in maintenance alerts and other alerts being sent to the standalone device. The improved battery monitoring system can reduce or eliminate the manual inspection of lead-acid batteries and can improve battery operation and longevity by ensuring an appropriate level of maintenance for each lead-acid battery.

12 Claims, 10 Drawing Sheets

(51) Int. Cl.
*H01M 2/36* (2006.01)
*H01M 10/42* (2006.01)

(52) U.S. Cl.
CPC ......... *H01M 10/48* (2013.01); *H01M 10/484* (2013.01); *H01M 10/486* (2013.01); *H01M 2010/4278* (2013.01); *H01M 2200/00* (2013.01)

(56) References Cited

U.S. PATENT DOCUMENTS

| | | | |
|---|---|---|---|
| 8,546,006 | B2 | 10/2013 | Beckley et al. |
| 8,928,326 | B2 | 1/2015 | Jones et al. |
| 2010/0019773 | A1 | 1/2010 | Son |
| 2011/0074357 | A1 | 3/2011 | Parakulam et al. |
| 2011/0082621 | A1 | 4/2011 | Berkobin et al. |
| 2011/0128154 | A1 | 6/2011 | Herrema et al. |
| 2011/0236730 | A1* | 9/2011 | Jones .................. H01M 2/362 429/50 |
| 2017/0163068 | A1* | 6/2017 | Li .......................... H02J 7/00 |

OTHER PUBLICATIONS

MFP—Microfluidic Inline Pressure Sensor, available at https://www.elveflow.com/microfluidic-flow-control-products/microfluidic-flow-control-module/mfp-microfluidic-inline-pressure-sensor/ on Feb. 17, 2016 (Year: 2016).*

Personal area network, available at https://en.wikipedia.org/wiki/Personal_area_network on Mar. 2, 2016 (Year: 2016).*

SMARTIe Bluetooth electrolyte level and temperature sensor for flooded batteries, available at website https://www.assetor.net/solution/batteries-products.

International Search Report and Written Opinion of PCT/US16/68881 dated Apr. 28, 2017, 10 pages.

* cited by examiner

INTELLIGENT MONITORING SYSTEMS FOR LIQUID ELECTROLYTE BATTERIES

FIELD OF THE INVENTION

The present invention relates to intelligent systems for monitoring the condition and performance of liquid electrolyte batteries, for example lead-acid batteries.

BACKGROUND OF THE INVENTION

Liquid electrolyte batteries, for example lead-acid batteries, provide electrical energy by means of an electrochemical reaction. The electrochemical reaction involves the reaction of an acid, for example sulfuric acid, with a battery electrode to create an electrical potential. Owing to their reliability and low cost, lead-acid batteries are among the primary sources of electrical power for self-powered vehicles (including for example forklifts and reach trucks), standby power and other applications.

A variety of sensors exist for monitoring the condition or performance of lead-acid batteries. For example, lead-acid batteries experience a loss of water when recharging and from heat induced water evaporation. Accordingly, known water level sensors can measure the liquid level within the battery enclosure. Additional sensors are known to measure ambient air temperature, battery fluid temperature, battery voltage, amp-hour throughput, and half-voltage (the voltage of one half of the battery as compared to the other half of the battery).

A variety of issues arise with existing sensors, however. For example, existing sensors lack integration, and do not entirely mitigate the need to manually inspect each battery. In addition, existing liquid level sensors do not measure the amount of water consumed by the battery, and instead measure the presence or absence of a predetermined liquid level at a given point in time.

Accordingly, there remains a continued need for an improved battery monitoring system for liquid electrolyte batteries, and in particular lead-acid batteries. In addition, there remains a continued need for an improved battery monitoring system that automatically monitors the condition and performance of lead-acid batteries to thereby improve battery operation and longevity.

SUMMARY OF THE INVENTION

A battery monitoring system for a plurality of liquid electrolyte batteries is provided. The battery monitoring system includes a network of sensors for monitoring the condition or performance of each of the plurality of batteries. Sensor data from the network of sensors is shared with a standalone device over a wireless network. The standalone device, for example a smartphone or a tablet, communicates with a server for analysis of the sensor data. The standalone device provides maintenance alerts to ensure the proper care and maintenance of the plurality of batteries.

In one embodiment, each of the plurality of batteries includes a control module in electrical communication with the network of sensors. The sensors can include a voltage sensor, a flow rate sensor, a pressure sensor, a liquid level sensor, an amp-hour throughput current sensor, and a dirty battery sensor. The control module additionally includes an on-board temperature sensor and an on-board accelerometer. The sensors measure the electrolyte liquid level, the electrolyte liquid temperature, the ambient temperature, the battery orientation, the amp-hour throughput, the voltage between positive and negative terminals, and the half voltage of the battery.

In another embodiment, the control module shares data over the wireless network, optionally in accordance with the Bluetooth Smart advertising mode. The first packet relates to battery status. The battery status packet can alert the user if a battery requires immediate attention. For example, the battery status packet can contain information relating to battery impacts, battery temperature, cell imbalance, and low electrolyte levels. The second packet includes historical sensor data, the historical sensor data including a digital timestamp. The historical sensor data is forwarded to the server for storage and analysis.

In still another embodiment, the control module shares data with the standalone device over a wireless personal area network, for example a Bluetooth Smart network or a ZigBee network. The standalone device can include a smartphone, a tablet, a laptop computer, a desktop computer, or a vehicle computer adapted to receive data over the wireless personal area network. The standalone device can also include a gateway (wireless access point), a cellular system, or a mesh network. The standalone device includes an application program adapted to display maintenance alerts or other alerts, indicating for example an unsafe liquid level or an unsafe battery temperature.

In even another embodiment, the battery monitoring system measures the amount of water added to a lead-acid battery. The battery monitoring system includes a flow rate sensor, a pressure sensor, and a microprocessor coupled to the output of the flow rate sensor and the pressure sensor. The microprocessor determines the amount of water added to the lead-acid battery based on the measured pressure within a feed tube when the flow rate exceeds a predetermined minimum flow-rate. The amount of water added to the battery can indicate the condition of the battery and its remaining useful life.

In yet another embodiment, the battery monitoring system measures the amount of water added to a lead-acid battery without a flow-rate sensor. In this embodiment, the microprocessor determines the amount of water added to the lead-acid battery based on the period of time between when the water pressure exceeds a minimum pressure and when the water pressure stabilizes at a maximum pressure. As noted above, the amount of water added to the battery can indicate the condition of the battery and its remaining useful life.

In still another embodiment, the battery monitoring system determines if water was added to a lead-acid battery using a pressure sensor, optionally without a flow-rate sensor. In this embodiment, the microprocessor measures the output of the pressure sensor to determine if a battery has been watered. If the battery has not been watered, the user can be alerted to the need to water the battery, optionally through maintenance alerts published to the standalone device.

In even another embodiment, the battery monitoring system includes a multi-axis accelerometer, a microprocessor coupled to the output of the accelerometer, and a standalone unit in wireless communication with the microprocessor. The microprocessor is operable to determine an impact to the battery housing and an orientation of the battery housing based on the accelerometer output. This information is broadcast to the standalone device. The standalone device can alert a user of an unsafe battery condition, for example a battery housing being in an unsafe orientation (e.g., severely tilted) or a battery housing that was subject to an unsafe impact (e.g., dropped).

The present invention can therefore provide an improved battery monitoring system for liquid electrolyte batteries, and in particular lead-acid batteries. The improved battery monitoring system can replace existing sensors with a network of connected sensors to provide analysis of battery performance and battery condition. The improved battery monitoring system can reduce or eliminate the manual inspection of lead-acid batteries and can improve battery operation and longevity by ensuring an appropriate level of maintenance for each lead-acid battery.

These and other features and advantages of the present invention will become apparent from the following description of the invention, when viewed in accordance with the accompanying drawings and appended claims.

DETAILED DESCRIPTION OF THE CURRENT EMBODIMENTS

The invention as contemplated and disclosed herein includes a battery monitoring system for liquid electrolyte batteries, and in particular lead-acid batteries. As set forth below, the battery monitoring system includes a network of sensors for monitoring the condition or performance of a plurality of liquid electrolyte batteries. The sensor data is shared with a standalone device over a wireless network. A server in electrical communication with the standalone device receives the data for analysis, which can result in additional maintenance alerts and other alerts being sent to the standalone device.

I. Battery Overview

Figure 1:
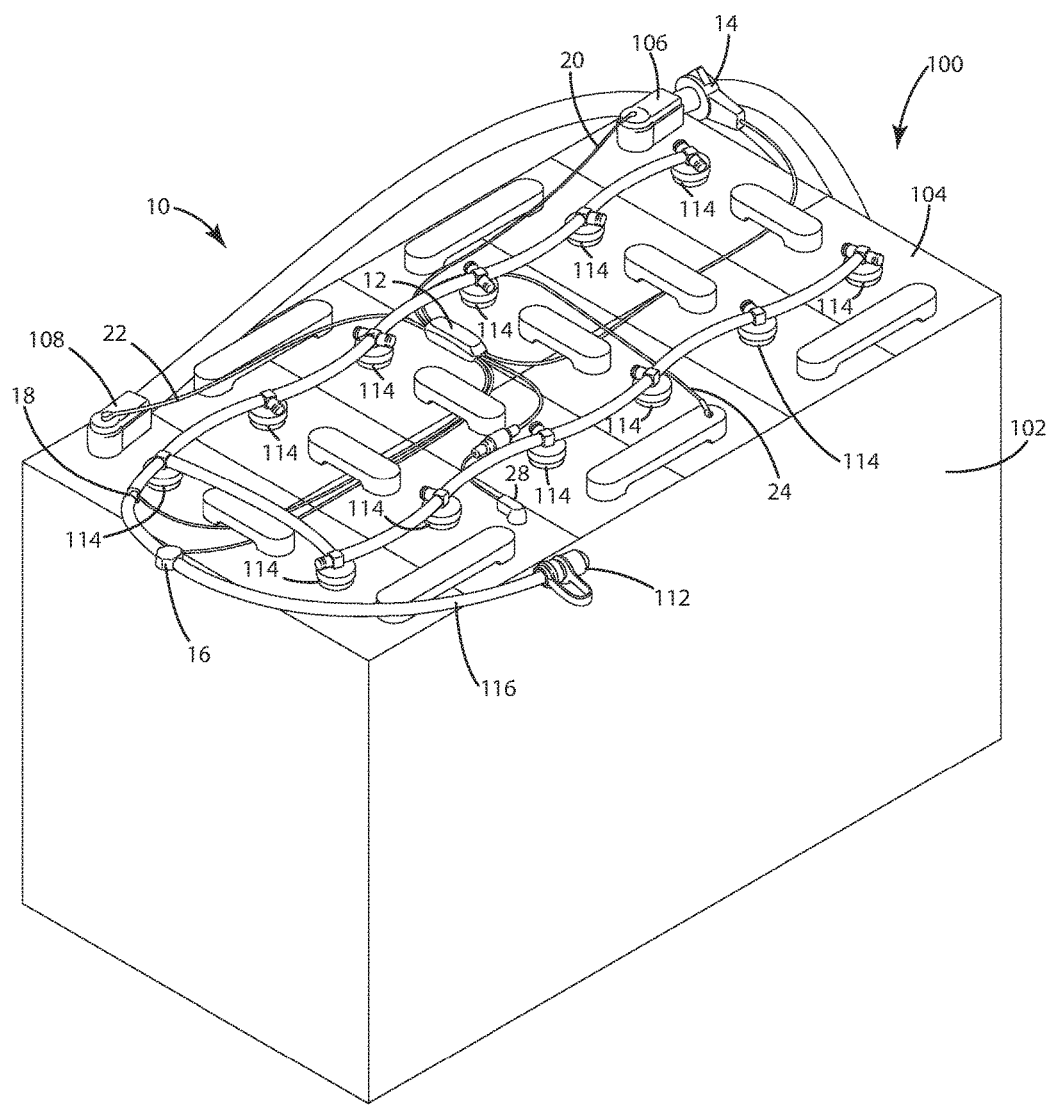
FIG. 1 is a perspective view of a deep cycle lead-acid battery coupled to a single point watering system.

Referring now to FIG. 1, an exemplary liquid electrolyte battery is illustrated and generally designated 100. The liquid electrolyte battery 100 is a deep cycle lead-acid battery including multiple battery cells that house an assembly of electrodes, electrolyte solution, and terminals. The battery cells share a common housing 102, and include a 12 volt construction. Each battery cell includes a small vent opening on the housing cover 104. The lead-acid battery also includes vent caps that are twisted into the vent openings for each battery cell. Positive and negative terminals 106, 108 protrude from the top of the housing cover 104.

During recharging, and due to heat induced water evaporation, the lead-acid battery 100 will experience a loss of water. As shown in FIG. 1, a single point watering system 110 provides water to each battery cell. The single point watering system includes a flexible feed tube 116 that provides a fluid flow path from an inlet 112 to each battery cell. The single point watering system also includes a refill control valve 114 for each battery cell, replacing the vent caps and being twisted into the vent openings for each battery cell.

II. System Overview

As noted above, the current embodiments include a battery monitoring system for monitoring the condition or performance of a plurality of deep cycle lead-acid batteries. The battery monitoring system 10 is shown in FIGS. 1-5 and includes a control module 12, a plurality of external sensors, and a plurality of internal sensors. The external sensors include a current sensor 14, a flow rate sensor 16, a pressure sensor 18, a positive electrode 20, a ground electrode 22, a half voltage electrode 24, a liquid level sensor 28, and a dirty battery sensor 30. The internal sensors (internal to the control module 12) include a temperature sensor 32 and an accelerometer 34. Other embodiments include greater or fewer number of external sensors and/or internal sensors as required. Each sensor measures a characteristic (e.g., condition or performance) of the lead-acid battery 100. The measured characteristic can include the electrolyte liquid level, the electrolyte liquid temperature, the ambient temperature, the housing integrity (e.g., any history of past drops or impacts), the housing orientation, the voltage between positive and negative terminals, and the half voltage of the battery 100. Other characteristics can be measured in other embodiments as desired.

Figure 2:
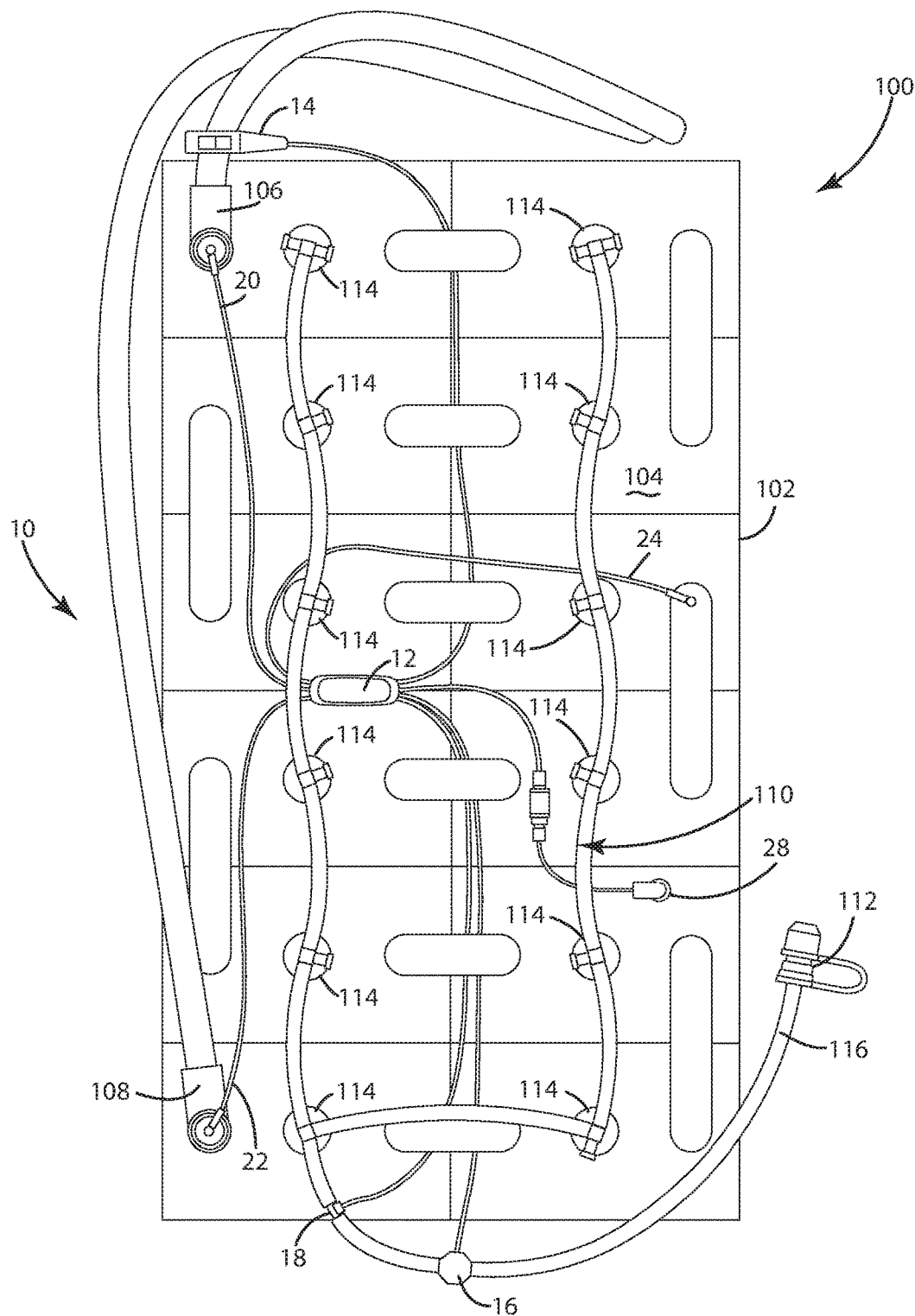
FIG. 2 is a top plan view of a deep cycle lead-acid battery coupled to a single point watering system.
Figure 3:
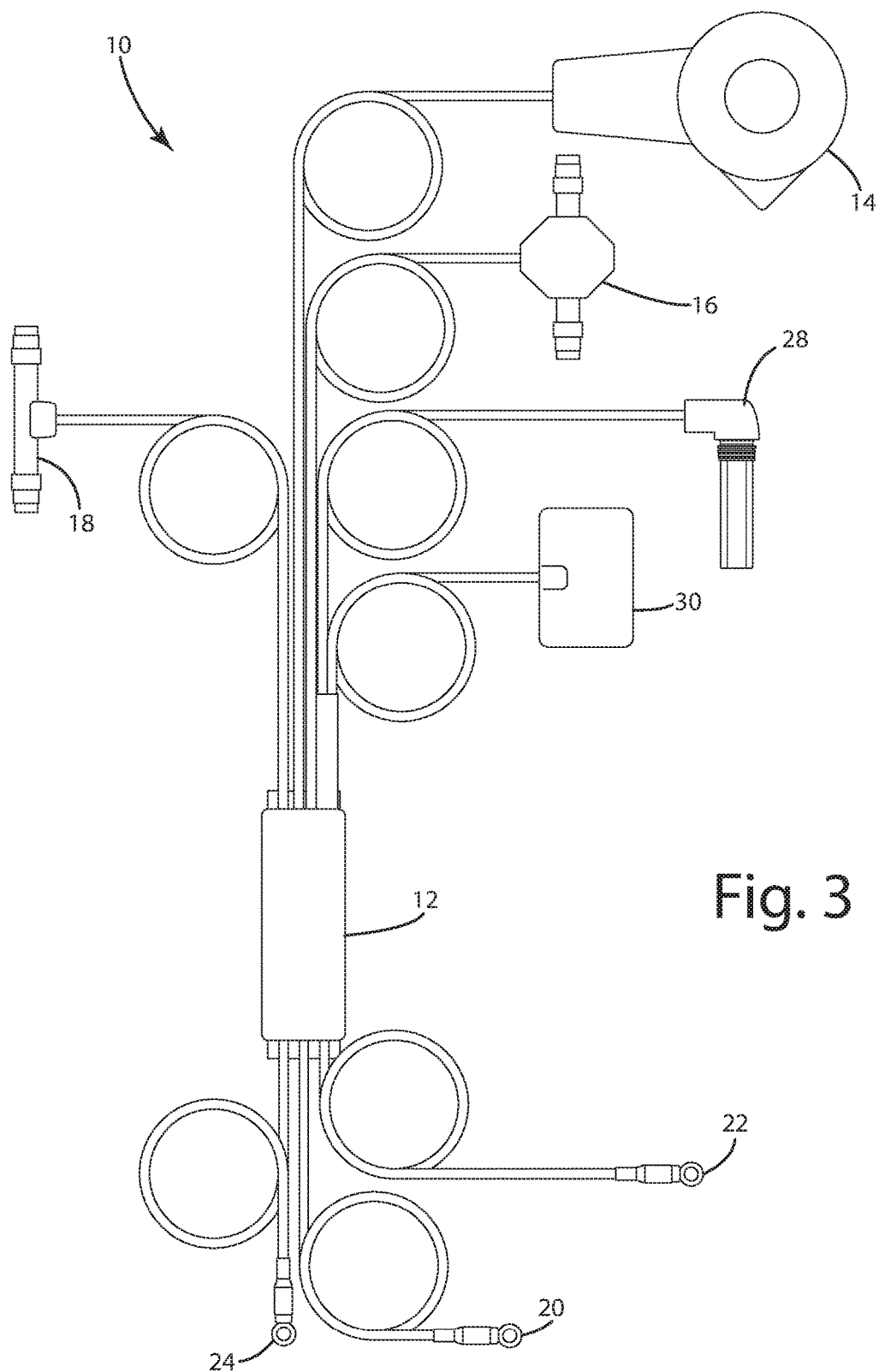
FIG. 3 is a top plan view of a battery monitoring system in accordance with a current embodiment.
Figure 4:
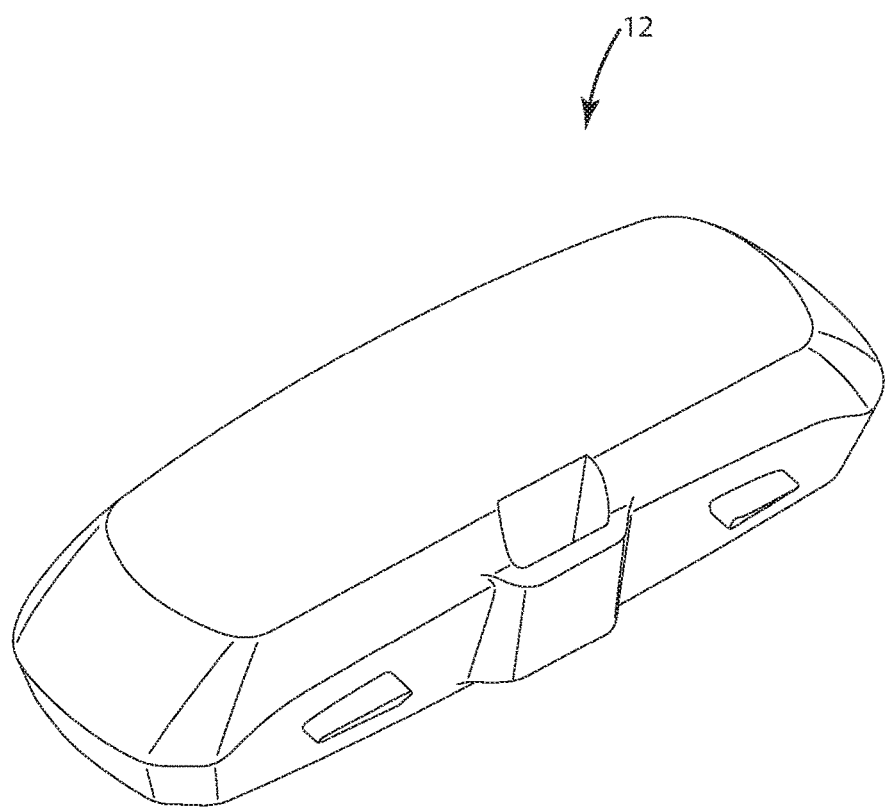
FIG. 4 is a perspective view of a control module with internal wireless communications circuitry in accordance with a current embodiment.

As shown in FIGS. 1-2, the control module 12 is centrally mounted to the housing cover 104. The control module 12 includes an internal controller for processing the output of the sensors noted above. The controller is a microprocessor 40 in the present embodiment, but can include an application specific integrated circuit (ASIC) or a field programmable gate array (FPGA) in other embodiments, for example. The microprocessor 40 is coupled to output of each sensor identified above, optionally through an analog to digital converter (ADC) 42. The control module 12 can additionally include a shift register, for example parallel-in, serial-out shift register to reduce the number of inputs to the microprocessor 40. The shift register can be incorporated into the signal conditioning circuit 44, shown in FIG. 5 as being connected between the external sensors and the microprocessor 40. The microprocessor 40 can additionally include an integrated communications circuit for communication over a wireless personal area network, for example a Bluetooth Smart (BLE) network. Other networks include ZigBee networks and Wi-Fi networks, for example. Where a Bluetooth Smart network is used, the integrated communications circuit can include a Bluetooth chip and integral 2.4 GHz antenna for communication with a standalone device (discussed below).

Figure 5:
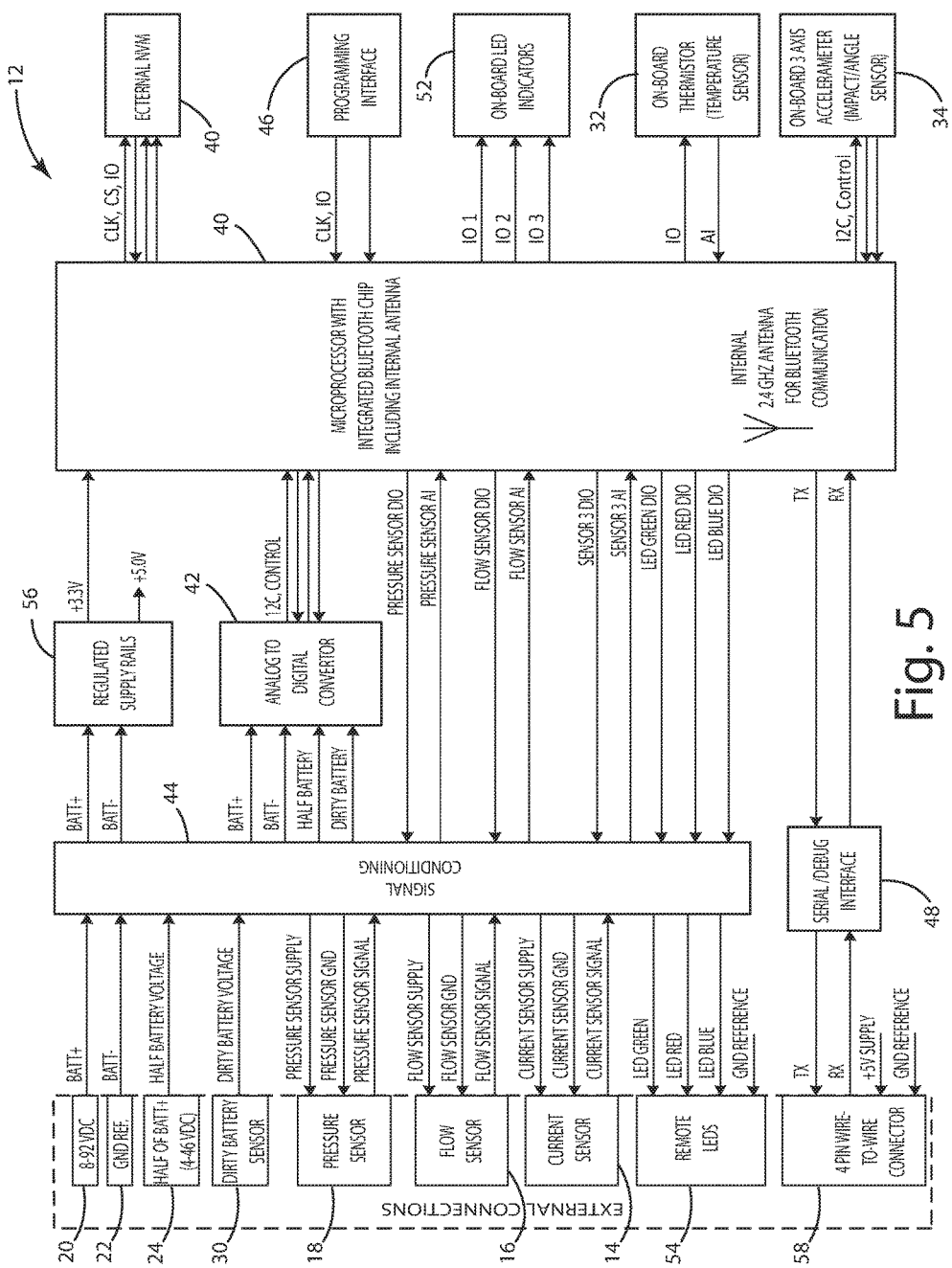
FIG. 5 is a schematic diagram of the control module in accordance with a current embodiment.

As also shown in FIG. 5, the control module 12 includes a programming interface 46, a serial debugger interface 48, an on-board temperature sensor 32, an on-board accelerometer 34, external non-volatile memory (NVM) 50, on-board LED indicators 52, a serial bus to remote LED indicators 54, a regulated rail voltage 56, and a four-pin wire-to-wire connector 58. The programming interface 46 receives computer readable instructions for processing the sensor data and/or broadcasting the sensor data over the wireless network. The serial debugger interface 48 supports data transfer to verify the microprocessor 40 is working properly before packaging and shipment. The on-board temperature sensor 32 provides a temperature measurement for output to the microprocessor 40. The temperature sensor 32 can include a thermistor having a variable resistance. By measuring the resistance of the thermistor, optionally using a voltage divider, the microprocessor 40 can determine the ambient air temperature. The on-board accelerometer 34 is a three-axis accelerometer to measure the orientation of the battery 100 (e.g., upright, inverted, tilted) and any impacts to the battery 100. The on-board LED indicators 52 provide immediate feedback regarding the condition or performance of the battery 100. In some embodiments, the on-board indicators 52 include three LEDs: a steady green LED, a steady red LED, and a flashing red LED. The steady green LED can indicate the liquid level does not need refilling, the flashing red can indicate the liquid level needs refilling, and the steady red can indicate the liquid level is too high. Though described as being present on the control module 12, the LED indicators 52 can also or alternatively be present elsewhere, for example on the liquid level sensor 28. The LED indicators 42 can alternatively be present at the end of a wire protruding from the control module 12. Lastly, the wire-to-wire connector 58 includes four connections in the present embodiment, two to the microcontroller (5V and ground) and two to the serial debugger interface 48 (transfer and receive).

Figure 6:
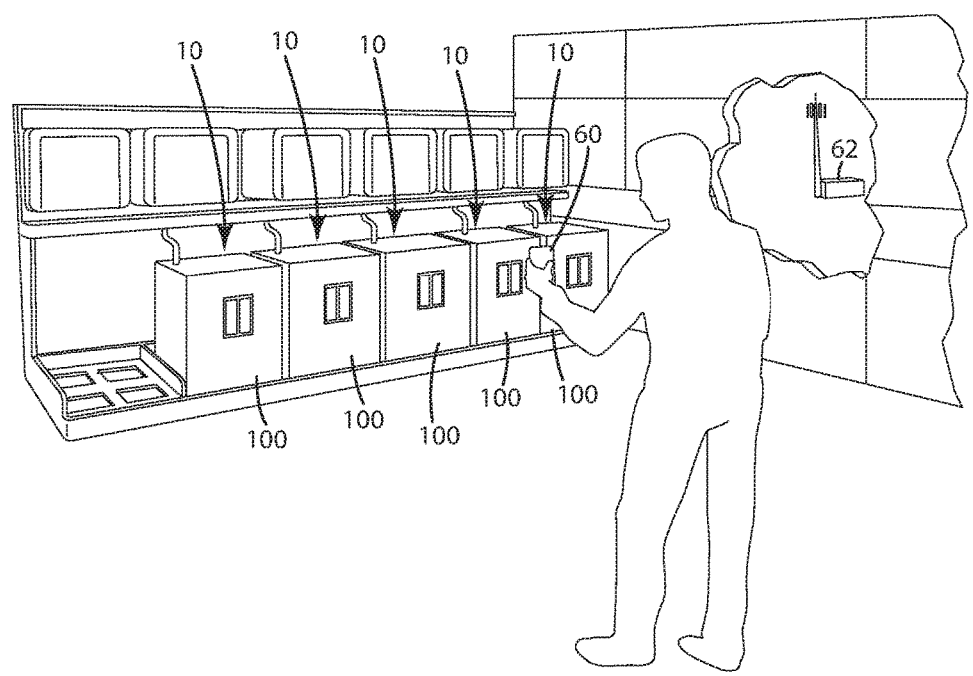
FIG. 6 is an illustration of a battery monitoring system including a handheld device and a remote server for determining battery alerts.

Periodically or as the sensor data is collected, the control module 12 publishes or transmits the sensor data over the wireless network for a nearby standalone device 60. The standalone device 60 includes a handheld device, for example a smartphone, a tablet, or a laptop, or includes a desktop device, for example a computer workstation, or a component of a vehicle, for example an on-board vehicle computer. The standalone device 60 then communicates all or a portion of the data to a remote server 62 for further analysis. As shown in FIG. 6, the standalone device 60 can be connected to a plurality of battery monitoring systems 10 over the wireless network. The data transmitted to the remote server 62 can be stored in a remote database and/or analyzed. For example, the remote server 62 can analyze the sensor data and communicate added maintenance alerts and other alerts to the standalone device 62.

To reiterate, the standalone device 60 acquires sensor data from a plurality of control modules 12, each associated with a battery 100. In one embodiment, the control modules 12 communicate with the standalone device 60 according to the Bluetooth Smart protocol (also called Bluetooth Low Energy, Bluetooth LE, or BLE). According to the Bluetooth Smart protocol, the control modules 12 are each a peripheral device that posts data for a central device to read. The standalone device 60, as a central device, reads the published data from the control modules 12. The control modules 12 can update the published data regularly or in response to an event, for example when there is a significant change to the sensor data. The sensor data includes two packets. The first packet includes battery status. The battery status packet can be used to alert the user that the battery requires an action item. For example, the battery status packet can contain information relating to battery impacts, over temperature, cell imbalance, and low electrolyte levels. The action item can include refilling the battery with water, replacing the battery with a new battery, cleaning the battery top cover, or returning the battery to an upright orientation. The action item can also include equalization, charging a battery, repairing a battery, temperature single point watering system repair, or state of charge. The action items can be presented to the user on a touch screen display of the standalone device 62, for example. The second packet can include historical sensor data, the historical sensor data including a digital timestamp for diagnostic analysis by the remote server 62 as explained further below.

More particularly, the remote server 62 includes a processor to execute a series of diagnostic functions relative to the batteries 100. Based on the output of the diagnostic functions, the remote server 62 transmits one or more maintenance alerts to the standalone device 60. In other embodiments, however, the standalone device 60 includes an internal processor adapted to execute the diagnostic functions relative to the batteries 100. In these embodiments, the remote server 62 is omitted, and the standalone device 60 provides self-alerts. The diagnostic functions include a series of instructions stored in a computer readable data storage device. The computer readable data storage device can be a portable memory device that is readable by a processor. Such portable memory devices can include a compact disk, a digital video disk, a flash drive, and any other disk readable by a disk driver embedded or externally connected to a computer, a memory stick, or any other portable storage medium whether now known or hereinafter developed. Alternatively, the machine-readable data storage device can be an embedded component of a computer such as a hard disk or a flash drive of a computer.

III. Sensor Overview

As noted above, the battery monitoring system 10 includes a variety of sensors for measuring and reporting one or more characteristics of the battery 100. Exemplary sensors are discussed below by non-limiting example; additional sensors can be utilized in other embodiments as desired. The sensor data is time stamped and analyzed by the microcontroller 40 before being broadcast over the wireless network.

The current sensor 14 is an electrical sensor adapted to measure the power output of the battery 100. As shown in FIG. 5, the current sensor 14 is coupled to the signal conditioning circuit 44 with two inputs (supply and ground) and one output (current sensor signal). The analog value of the signal is proportional to the power output of the battery 100, and is output to the microprocessor 40 as an analog input.

The flow sensor 16 is an in-line flow sensor having an inlet and an outlet in fluid communication with the feed tube 116. The flow sensor 16 includes an internal rotor and an internal hall-effect sensor. The speed at which the rotor spins will vary in dependence on the water flow rate. The hall-effect sensor outputs a corresponding pulse signal to the signal conditioning circuit 44, which in turns outputs to the microprocessor 40 through an ADC 42. The microprocessor 40 then converts the digital signal to a value corresponding to the flow rate within the feed tube 116.

The pressure sensor 18 is an in-line pressure sensor having an inlet and an outlet in fluid communication with the feed tube 116. The pressure sensor 18 outputs an analog signal in proportion to the fluid pressure in the feed tube 116. The output of the pressure sensor 18 is coupled to the signal conditioning circuit 44, which in turns outputs to the microprocessor 40 through an ADC 42. The microprocessor 40 then converts the digital signal to a value corresponding to the pressure within the feed tube 116.

The half voltage sensor 24 is adapted to compare the voltage at one half of the battery 100 against the voltage at the other half of the battery 100. As shown in FIG. 5, the half voltage sensor 24 includes an output to the signal conditioning unit 44, the output being between 4 and 46 volts DC. The half battery voltage is one of four inputs into the ADC 42, which also includes each terminal voltage (represented by BATT+ and BATT−) and the dirty battery voltage.

The liquid level sensor 28 includes a capacitive sensor that measures the liquid level within the battery housing 104. The capacitive sensor provides an output that varies as the liquid level increases in relation to the probe. The output of the liquid level sensor 28 is coupled to the wire-to-wire connector 58 and subsequently the microprocessor 40. The structure and functionality of the liquid level sensor 28 are set forth in U.S. application Ser. No. 15/079,125 entitled "Liquid Level Sensor for Battery Monitoring Systems," filed on even date herewith, the contents of which are incorporated by reference in their entirety.

The dirty battery sensor 30 detects the accumulation of electrolyte on the battery cover 104, and includes a conductive pad on the battery cover 104. The conductive pad outputs a voltage to the signal conditioning circuit 44, shown in FIG. 5 as the "dirty battery voltage." The ADC 42 outputs a digital signal to the microprocessor 40, the digital signal being based on the dirty battery voltage. Once the voltage between the negative terminal 22 and the conductive pad falls within a predetermined range, a short is present on the battery cover 104, and a signal can be sent to the standalone unit 60 to notify the end user that the battery cover 104 should be cleaned.

The on-board temperature sensor 32 provides a temperature measurement above the water level (e.g., atop the battery cover 104) for output to the microprocessor 40. The on-board temperature sensor 32 includes a thermistor in the present embodiment, the thermistor having a resistance in proportion to the ambient temperature. The output of the on-board temperature sensor 32 is an analog input to the microprocessor 40.

The on-board accelerometer 34 is a three-axis accelerometer that provides orientation sensing, free fall sensing, and impact sensing. More particularly, the on-board accelerometer 34 measures the orientation of the battery 100 (e.g., upright, inverted, tilted) and any free fall events or impacts to the battery 100. The output of the on-board temperature sensor 32 is an analog input to the microprocessor 40.

Figure 7:
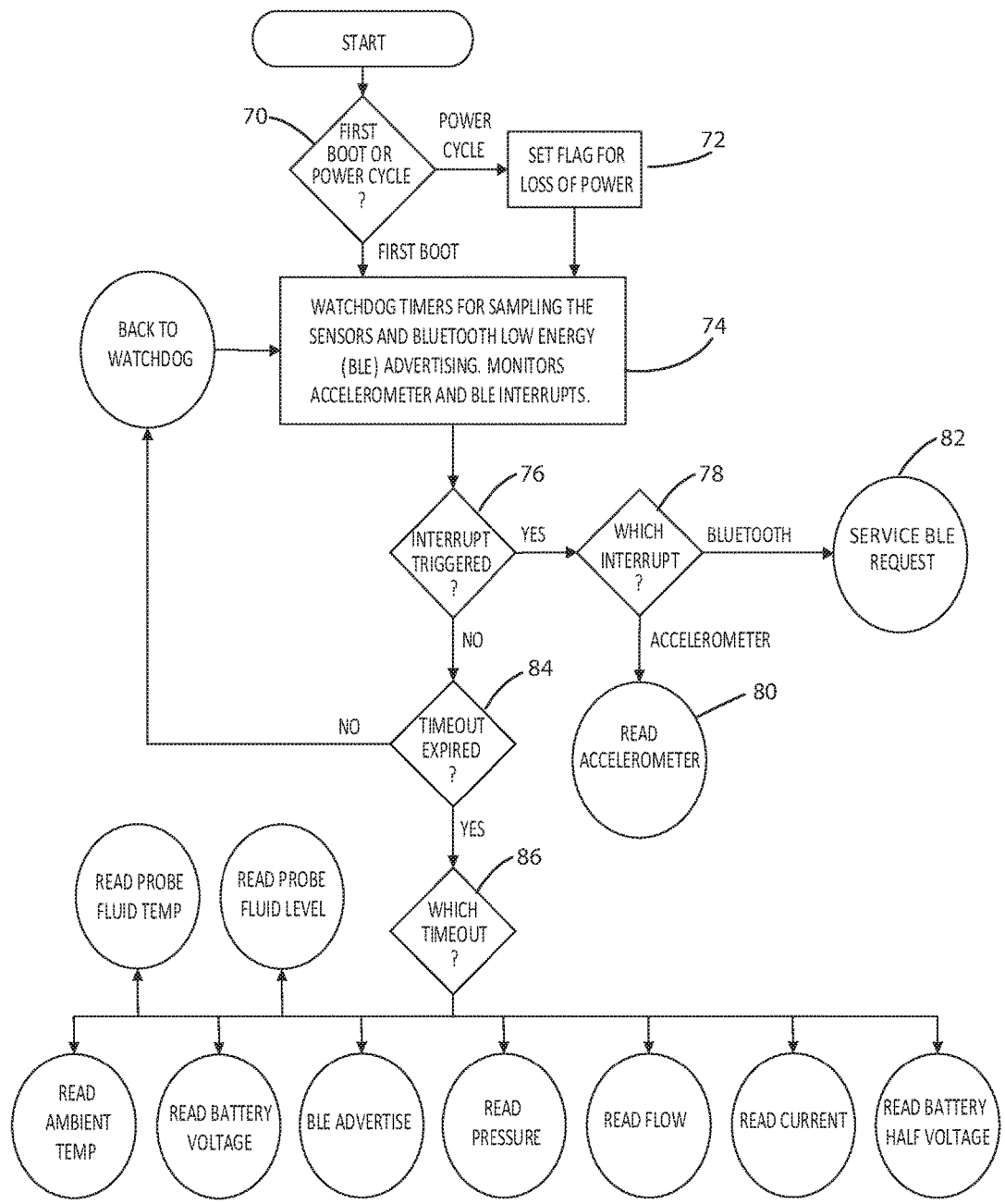
FIG. 7 is a flow chart illustrating the collection of sensor data in accordance with a current embodiment.

With reference to FIG. 7, a flow chart depicting operation of the sensor data is depicted. At decision step 70, the microprocessor 40 determines if the present iteration follows from a boot-up or a power cycle. If a power cycle is detected, the microcontroller sets a flag for loss of power in non-volatile memory 50 at step 72 for later transmission to the standalone device 60. If a boot-up is detected, the microprocessor 40 initiates watchdog timers for sampling the sensor data, transmitting over the wireless network, and polling the onboard sensors at step 74. As used herein, watchdog timers include an electronic countdown timer that regularly restarts during normal operation. At decision step 76, the microprocessor 40 determines if an interrupt is triggered. If an interrupt is triggered, the microprocessor 40 identifies the interrupt as being from the accelerometer or communications circuit at step 78. The microprocessor 40 reads the accelerometer 34 at step 80 or services the communications request at step 82 depending on the outcome of decision step 78. At decision step 84, the microprocessor 40 determines if a timeout has expired. If not, the microprocessor 40 returns to step 74. If a timeout has expired, the microprocessor 40 identifies the source of the timeout at decision step 86. The microprocessor 40 then reads the sensor data in accordance with the source of the timeout, and thereafter returns to step 74. In the absence of any timeouts, the microprocessor 40 stores sensor data to non-volatile memory 50 for comparison against threshold values also stored to non-volatile memory 50. The threshold values can be updated from time to time by the standalone device 60. Sensor data that is outside of expected parameters is time-stamped and stored to non-volatile memory 50 for broadcast over the wireless network, optionally the Bluetooth LE wireless personal area network.

Figure 8:
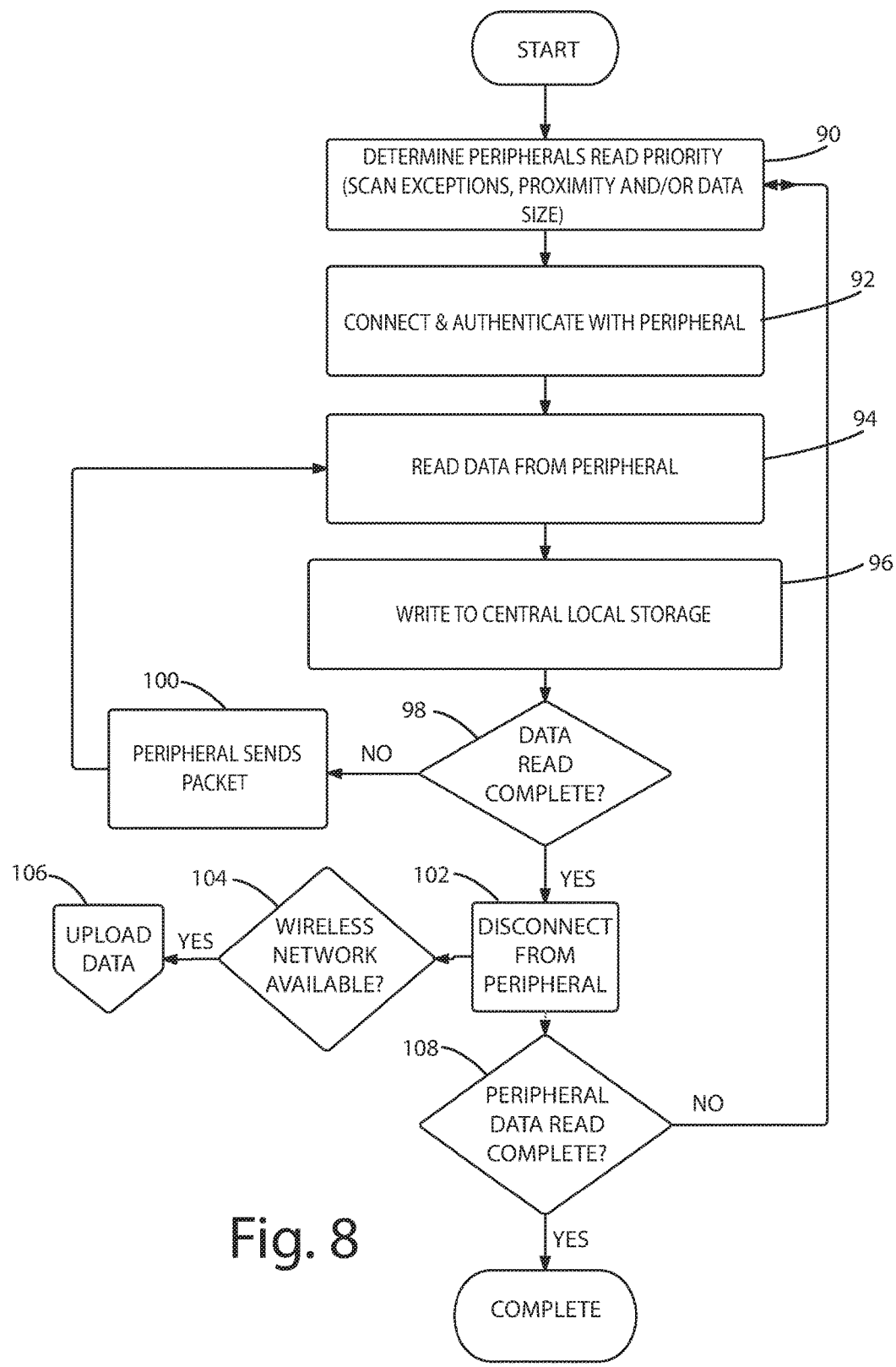
FIG. 8 is a flow chart illustrating the uploading of sensor data from a plurality of control modules to a local standalone device.

The reading of data by the standalone device 60 is further illustrated in FIG. 8. At step 90, and after discovering each control module 12 on the local wireless network, the standalone device 60 identifies each control module 12 (identified as a "peripheral device" or "peripheral" in FIGS. 8 and 9). At step 92, the standalone device 60 connects with and authenticates each such control module 12. The standalone device 60 reads data from each such control module 12 at step 94 and writes the data to local memory at step 96. The standalone device 60 determines if the data read is complete at step 98. If the data read is not complete, the standalone device 60 continues to look for data packets from the control modules 12 at step 100. If the data read is complete, the standalone device 60 disconnects from the control modules 12 at step 102. If a wireless network is available at step 104, the standalone device 60 uploads the data to the remote server 62 at step 106. At decision step 108, the standalone device 60 determines if the data read is complete, and if not, returns to step 90 for a further iteration.

Figure 9:
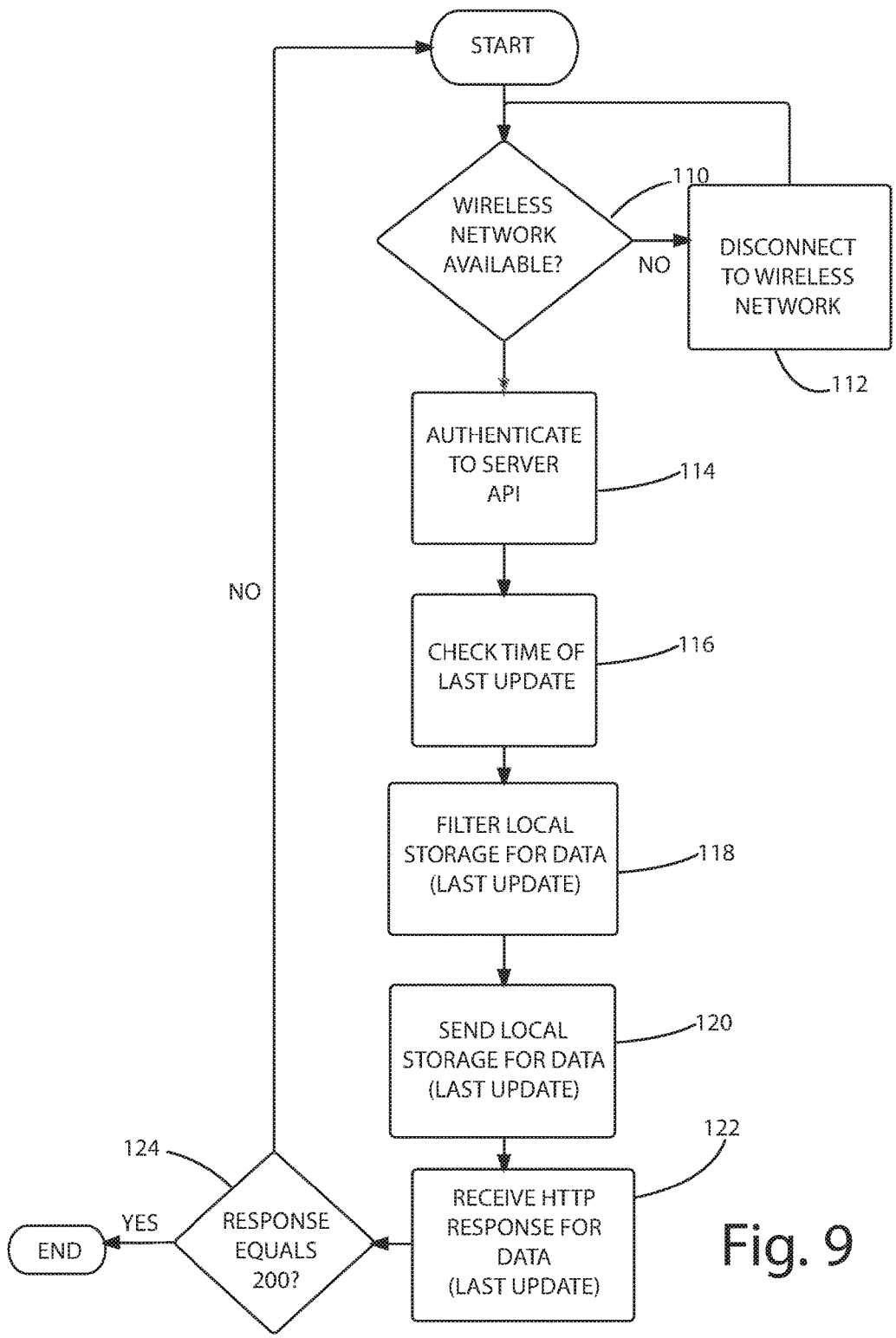
FIG. 9 is a flow chart illustrating the uploading of sensor data from a local standalone device to a remote server.

The uploading of data from the standalone device 60 to the server 62 is further illustrated in FIG. 9. At step 110, the standalone device 60 determines if a wireless network is available. If no wireless network is available, the standalone device 60 continues with attempts to connect to a wireless network at step 112. If a wireless network is available, the standalone device 60 authenticates to the server application programming interface (API) at step 114. At step 116, the standalone device 60 checks the time of the last update. At step 118, the standalone device 60 filters its local storage for data received from the control modules 12 since the last server upload. At step 120, the standalone device 60 transmits a POST request to the server 62, requesting that the server 62 accept and store data accompanying the POST request, the data corresponding to timestamped sensor data from the control modules 12. At step 122, the standalone device 60 receives a response code and message from the server 62. At step 124, the standalone device 60 determines if the request was received by the server 62 and is being processed, e.g., response code 200 in HTML. The standalone device 60 repeats or terminates the above process depending upon whether receipt of the POST request was acknowledged by the server 62.

IV. Diagnostic Functions

As noted above, the battery monitoring system 10 is adapted to provide automated diagnostics for the plurality of lead-acid batteries 100. The automated diagnostics can result in maintenance alerts to ensure the proper care and maintenance of each of the plurality of lead-acid batteries 100. The diagnostics can be performed remotely by the control module microprocessor 40 in some embodiments, while in other embodiments the diagnostics can be performed locally by the standalone device 60 or by the server 62. The resulting maintenance alerts are then presented by an application program hosted on the standalone device 60 for viewing by the user.

In accordance with the current embodiments, a number of diagnostic functions are presented below. These diagnostic functions include: (a) measuring the liquid level within each of the plurality of batteries; (b) measuring the volume of water added to each of the plurality of batteries using a flow rate sensor and a pressure sensor; (c) measuring the volume of water added to each of the plurality of batteries using a pressure sensor but not a flow-rate sensor; and (d) measuring the orientation of the batteries and any unsafe impacts using an accelerometer. Additional diagnostic functions can be utilized in other embodiments as desired. The output of each diagnostic function generally includes an alert to the standalone device to indicate an action item with respect to a battery. The action item can include refilling the battery with water, replacing the battery with a new battery, cleaning the battery top cover, or returning the battery to an upright orientation. Other alerts can be generated in other embodiments as desired.

Measuring the liquid level within the batteries generally includes measuring the output of the liquid level sensor 28 and comparing the output against a predetermined minimum liquid level. The output of the liquid level sensor 28 varies in relation to the liquid level within the battery, such that a plurality of non-zero liquid levels can be detected. If the comparison (performed by the microprocessor 40, the standalone device 60, or the server 62) determines that the measured liquid level is below the minimum liquid level, the standalone device 60 generates an alert to the user. The alert can include an action item to refill the battery prior to its next use. The action item can be presented on an application program hosted on the standalone device 60.

Measuring the volume of water added to the batteries generally includes (for each battery) measuring the flow rate of water moving through the feed tube 116, calculating the volume of water added during the period in which the measured flow rate exceeded a minimum flow rate, outputting the calculated water volume for an application program hosted on the standalone device 60, and optionally indicating to the user of the standalone device 60 when the watering is complete. Calculating the volume of water added is performed by multiplying the flow rate (as derived from the output of the flow rate sensor 16) by the area of the feed tube 116 to determine the volumetric flow rate. The volumetric flow rate is then multiplied by the total time period in which flow rate exceeded a minimum flow rate, arriving at the measured volume of water added, also referred to as the "refilling volume" herein. If the flow rate is not steady, the above calculation can be performed by integrating the flow-rate over the same period. The measured volume of water added is then compared with an expected volume of water added for that particular battery. The expected volume of water added can be a function of the remaining useful life of the battery, which in turn can be based on the previous number of charges, for example. If the measured volume of water added exceeds the expected volume of water added, the standalone device 60 generates an alert to the user. The alert can include an action item to replace the aging battery. The action item can be displayed by an application program hosted on the standalone device 60. The standalone device 60 can additionally schedule water refillings based on the collected data.

Measuring the volume of water added to the batteries can alternatively include (for each battery) measuring the pressure of water moving through the feed tube 116, calculating the volume of water added during the period in which the measured pressure is between a minimum pressure and a maximum pressure, outputting the calculated water volume for an application program hosted on the standalone device 60, and indicating to the user of the standalone device when the watering is complete. Calculating the volume of water added is performed according to Bernoulli's equation in which the flow rate is derived from the pressure within the feed tube 116 (as measured by the pressure sensor 18). The flow rate is then multiplied by the area of the feed tube 116 to determine the volumetric flow rate. The volumetric flow rate is then multiplied by the total time period in which the measured pressure was between a predetermined minimum pressure and a predetermined maximum pressure, arriving at the refilling volume. If the flow rate is not steady, the above calculation can be performed by integrating the flow-rate over the same period. The refilling volume is then compared with an expected volume of water added for that particular battery. The expected volume of water added can be a function of the remaining useful life of the battery, which in turn can be based on the previous number of charges, for example. If the refilling volume exceeds the expected volume of water added, the standalone device 60 generates an alert to the user. The alert can include an action item to replace the aging battery. The action item can be displayed by an application program hosted on the standalone device 60. The standalone device 60 can additionally schedule water refillings based on the collected data. In some embodiments, this method is modified to detect whether the battery was watered, independent of a measurement of the amount of water added to the battery. For example, this method can include a determination of whether the battery was watered based on a comparison of the measured pressure (or the flow rate as derived above) with a threshold pressure (or a threshold flow rate). If the battery has not been watered, the standalone device 60 generates an alert to the user. The alert can include an action item to water the battery. The action item can be displayed by an application program hosted on the standalone device 60.

Measuring the orientation of the batteries and any unsafe impacts includes (for each battery) measuring the accelerometer output and determining, based on the accelerometer output, the orientation of the battery housing and any impacts thereto. The orientation of the battery housing can be compared with an acceptable range of orientations stored to computer readable memory. If the measured orientation is outside the accepted range of orientations, the standalone device 60 generates an alert to the user. The alert can include an action item to return the battery to its upright position. The action item can be presented on an application program hosted on the standalone device 60. If the accelerometer output reveals any g-forces in excess of a predetermined maximum g-force, the standalone device 60 generates an alert to the user. The alert can include an action item to visually inspect or replace the battery. The action item can be presented on an application program hosted on the standalone device 60.

Figure 10:
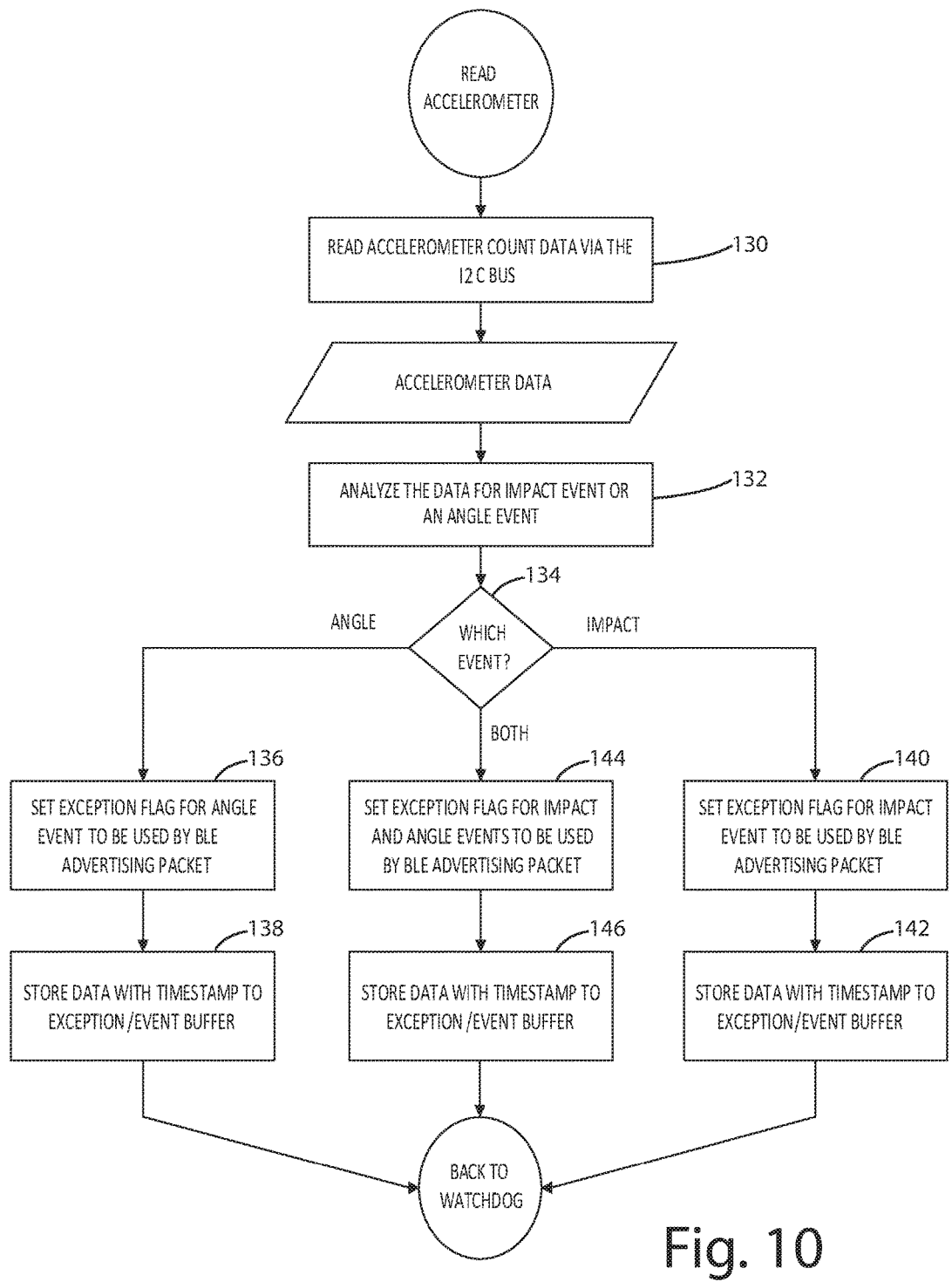
FIG. 10 is a flow chart illustrating the evaluation of accelerometer data for a battery in accordance with a current embodiment.

Further with respect to FIG. 10, measuring the orientation of the batteries and any unsafe impacts includes reading the accelerometer count data over a 12C-Bus at step 130. The accelerometer data is analyzed at step 132 for angle events and impact events. At decision step 134, the microcontroller determines if the accelerometer data relates to an angle event, an impact event, or both events. If an angle event is determined, the microprocessor 60 sets an exception flag for the angle event to be used by a Bluetooth LE advertising packet at step 136. This data is stored to NVM 50 with a timestamp at step 138. If an impact event is determined, the microprocessor 60 sets an exception flag for the impact event to be used by a Bluetooth LE advertising packet at step 140. This data is stored to NVM 50 with a timestamp at step 142. If both events are determined, the microprocessor 60 sets an exception flag for both events to be used by a Bluetooth LE advertising packet at step 144. This data is stored to NVM 50 with a timestamp at step 146. The stored data is later transmitted across the Bluetooth LE network for receipt by the standalone device 60 at step 130.

The application program for the standalone device 60 can therefore present a number of maintenance alerts pertaining to a plurality of batteries. The maintenance alerts can indicate a battery condition and/or an action item with respect to the battery. The action item can include a recommendation to visual inspecting the battery housing for cracks, refill the battery with water, replace the battery with a new battery, clean the battery top cover, or return the battery to an upright orientation. Other alerts can be generated in other embodiments as desired. The application program can also receive inputs from the user. For example, the application program can receive confirmation that the action item was performed, e.g., the battery was inspected, the battery was refilled with water, the battery was replaced, the battery was cleaned, or the battery was returned to an upright orientation. The input can be transmitted to one or both of the microcontroller 40 or the remote server 62.

The above description is that of current embodiments of the invention. Various alterations and changes can be made without departing from the spirit and broader aspects of the invention as defined in the appended claims, which are to be interpreted in accordance with the principles of patent law including the doctrine of equivalents. Any reference to elements in the singular, for example, using the articles "a," "an," "the," or "said," is not to be construed as limiting the element to the singular.

The invention claimed is:

1. A battery monitoring system for a battery having a plurality of cells, the system comprising:
a plurality of refill control valves, one for each of the cells;
a feed tube for directing a fluid to the refill control valves;
a flow rate sensor operatively connected to the feed tube to detect the flow rate of the fluid moving through the feed tube, the flow rate sensor providing an output;
a pressure sensor operatively connected to the feed tube to detect the pressure of the fluid moving through the feed tube, the pressure sensor providing an output; and
a controller electrically coupled to the output of the flow rate sensor and to the output of the pressure sensor, wherein the controller is operable to:
determine the flow rate of the fluid moving through the feed tube as a function of the output of the flow rate sensor,
determine the pressure of the fluid moving through the feed tube as a function of the output of the pressure sensor,
determine a first calculation of an amount of fluid added to the battery through the feed tube and the refill control valves during a first period of time in which the determined flow rate exceeds a minimum flow rate, and
determine a second calculation of the amount of fluid added to the battery through the feed tube and the refill control valves during a second period of time between when the determined pressure exceeds a minimum pressure and when the determined pressure stabilizes.

2. The battery monitoring system of claim 1 wherein the controller is further operable to output the determined amount of fluid for an application program hosted on a standalone device.

3. The battery monitoring system of claim 2 wherein the controller is adapted to communicate with the standalone device over a personal area network.

4. The battery monitoring system of claim 2 wherein the standalone device includes a smartphone, a tablet, a laptop, a desktop computer, an on-board vehicle computer, a wireless access point, a cellular system, or a mesh network.

5. The battery monitoring system of claim 1 wherein the pressure sensor is an in-line pressure sensor in communication with the feed tube.

6. A battery monitoring system for a battery having a plurality of cells, the system comprising:
a plurality of refill control valves, one for each of the cells;
a feed tube for directing a fluid to the refill control valves;
a flow rate sensor operatively connected to the feed tube to detect the flow rate of the fluid moving through the feed tube, the flow rate sensor providing an output; and
a controller electrically coupled to the output of the flow rate sensor, wherein the controller is operable to:
determine the flow rate of the fluid moving through the feed tube as a function of the output of the flow sensor; and
determine a calculation of an amount of the fluid added to the battery through the feed tube and the refill control valves during a period of time in which the determined flow rate exceeds a minimum flow rate the flow rate.

7. The battery monitoring system of claim 6 further including a communications module electrically connected to the controller.

8. The battery monitoring system of claim 7 wherein the communications module is adapted to communicate with the standalone device over a personal area network.

9. The battery monitoring system of claim 6 wherein the flow rate sensor is an in-line flow rate sensor having an inlet and an outlet in fluid communication with the feed tube.

10. A battery monitoring system for a battery having a plurality of cells, the system comprising:
a plurality of refill control valves, one of each of the cells;
a feed tube for directing a fluid to the refill control valves;
a pressure sensor operatively connected to the feed tube to detect the pressure of the fluid moving through the feed tube, the pressure sensor providing an output; and
a controller electrically coupled to the output of the pressure sensor, wherein the controller is operable to:
determine the pressure of the fluid moving through the feed tube as a function of the output of the pressure sensor, and
determine a calculation of an amount of fluid added to the battery through the feed tube and the refill control valves during a period of time between when the determined pressure exceeds a minimum pressure and when the determined pressure stabilizes.

11. The battery monitoring system of claim 10 wherein the controller is further operable to output an alert for an application program hosted on a standalone device if the battery has not been watered.

12. The battery monitoring system of claim 10 further including a communications module electrically connected to the controller, wherein the communications module is adapted to communicate with the standalone device over a personal area network.

* * * * *

UNITED STATES PATENT AND TRADEMARK OFFICE
CERTIFICATE OF CORRECTION

PATENT NO.        : 10,326,171 B2
APPLICATION NO.   : 15/079124
DATED             : June 18, 2019
INVENTOR(S)       : Mark Herrema et al.

It is certified that error appears in the above-identified patent and that said Letters Patent is hereby corrected as shown below:

In the Claims

Column 12, Claim 6, Lines 26, 27:
"flow rate the flow rate." should be -- flow rate. --

Signed and Sealed this
Thirteenth Day of August, 2019

Andrei Iancu
*Director of the United States Patent and Trademark Office*